United States Patent [19]

Asprey

[11] Patent Number: 5,222,228
[45] Date of Patent: Jun. 22, 1993

[54] CHARACTER AND SIGNAL GENERATOR FOR DETECTING KEYBOARD DISCONNECTED CONDITION GENERATED BY AN INTERRUPTED BOOTING PROCESS AND GENERATING SIGNAL INDICATING THAT KEYBOARD IS NOW COUPLED THERETO

[75] Inventor: Robert R. Asprey, Harvest, Ala.

[73] Assignee: Cybex Corporation, Huntsville, Ala.

[21] Appl. No.: 627,755

[22] Filed: Dec. 14, 1990

[51] Int. Cl.⁵ ............................................ G06F 3/023
[52] U.S. Cl. .................................... 395/500; 395/700; 364/709.09; 364/189; 364/DIG. 2; 364/975.2; 364/950.4; 341/22
[58] Field of Search .......................... 395/500, 700; 364/709.06, 709.09, 709.08, 709.11, 709.13

[56] References Cited

U.S. PATENT DOCUMENTS

| | | | |
|---|---|---|---|
| 4,460,957 | 7/1984 | Eggbrecht et al. | 395/325 |
| 4,710,869 | 12/1987 | Enokizono | 364/200 |
| 4,779,079 | 10/1988 | Hauck | 364/900 |
| 4,964,075 | 10/1990 | Shaver et al. | 364/900 |
| 5,056,057 | 10/1991 | Johnson et al. | 364/900 |
| 5,146,584 | 9/1992 | Christensen | 395/800 |

Primary Examiner—Thomas C. Lee
Assistant Examiner—Mehmet Geckil
Attorney, Agent, or Firm—Phillips & Beumer

[57] ABSTRACT

A signal generator for generating an F1 keyboard keystroke and a clock signal responsive to expiration of a time delay sufficient for a computer to which the generator is coupled to partially complete a "boot" process to a point where the computer has detected a "keyboard disconnected" condition and entered a "wait" state. The generated F1 keystroke provided to the computer by the signal generator indicates to the computer that a keyboard is now coupled to the computer, allowing the computer to continue the "boot" process.

In the embodiment disclosed, a time delay circuit provides an enabling signal after expiration of the time delay to a latch circuit, a clock signal generator, and a coupling circuit. The output of the latch circuit initially enables loading of a 12-bit shift register with data from a plurality of switches and thereafter switches the mode of the shift register from "load" to "shift." The clock signal clocks the data from the shift register, and the coupling circuitry couples the clock signal and the data from the shift register to the computer as it is clocked from the shift register. Termination circuitry detects the end of the data from the shift register and provides a disabling signal to the clock generator, ending the data stream upon occurrence of the last data pulse.

16 Claims, 2 Drawing Sheets

5,222,228

CHARACTER AND SIGNAL GENERATOR FOR DETECTING KEYBOARD DISCONNECTED CONDITION GENERATED BY AN INTERRUPTED BOOTING PROCESS AND GENERATING SIGNAL INDICATING THAT KEYBOARD IS NOW COUPLED THERETO

FIELD OF THE INVENTION

This invention relates generally to signal generation circuitry and particularly to signal generation circuitry for emulating a keystroke of a computer keyboard.

BACKGROUND OF THE INVENTION

With respect to computers, almost everyone is familiar with the PC-type computer having a keyboard and monitor. However, there are many applications where a plurality of computers are connected to perform different functions, such as in a control room of a large building wherein one computer operates the elevators, another computer operates the heating system, and perhaps a third computer operates the lighting system.

Another use occurs in the networking of computers wherein separate computers function as file servers that provide information to remote users. In these applications, the computers may be automatically powered up or down as needed and may be infrequently accessed on location for maintenance or to obtain statistical data therefrom. Computers utilized in this mode typically are not connected to a keyboard and monitor, this being done only for the purposes described, i.e., for maintenance or to obtain statistics.

To this end, the applicant, at Cybex Corporation in Huntsville, Ala., has been manufacturing and selling a device known as COMMANDER since Dec. 15, 1989. The COMMANDER modules sold after this date contain circuitry that selectively connects one of a plurality of computers to a single keyboard and monitor, and which incorporates the circuitry disclosed herein.

Problems with using PC-type computers without a keyboard and monitor are that in the process of powering up, or "booting" the computer, such as after a power failure, and particularly with computers having internal BIOS programs that poll inputs of the computer to determine what peripheral devices are coupled thereto, a relatively complicated procedure of handshaking, parity checks, etc., occurs between the computer and keyboard. In many cases, if the computer does not detect a keyboard during this "handshaking" process, the computer indicates a keyboard failure and goes into a "wait" state.

At this point, many computers require an F1 keystroke before continuing the boot process. This is equivalent to a scan code of "3B" hex for PC/XT-type computers and "05" hex for PC/AT-type computers. This data is transmitted using a clock/data two-wire serial transmission system. This keystroke is used to manually indicate that a keyboard is now connected, bypassing the handshaking that occurs between keyboard and computer and allows the computer to complete the boot process. Applicant believes keyboard emulators that emulate an entire keyboard have been manufactured by others and which uses microprocessor-based circuitry and a relatively large amount of associated logic to implement the complicated handshaking process in order to "boot" a computer without a keyboard. However, these devices have not been successful in the aforementioned market of users of multiple computers that are not each connected to keyboards. This failure of others may be due to the fact that much of the circuitry and associated cost of a keyboard emulator is unnecessary, as in most cases all that is required to complete the "booting" process is to wait for the computer to indicate a keyboard failure and then send an F1 code to the computer.

Accordingly, it is an object of this invention to provide circuitry for sending a data stream and a clock signal to a computer indicating that a keyboard is coupled thereto after it has gone into the aforementioned wait state and which is simpler in construction than the devices of prior art.

SUMMARY OF THE INVENTION

This invention relates to circuitry for generating and applying a keyboard data stream and keyboard clock pulses to a computer for allowing the computer to finish an initialization process after detecting a "keyboard disconnected" condition. The data stream and clock pulses are generated by a keyboard clock pulse and data stream generator which includes "in process" circuitry for providing an "in process" signal indicative of whether a data stream is being produced. This "in process" signal, along with potentials on clock and data inputs of the computer, is applied to separate inputs of an OR gate. With all inputs at a "low" logic state, an enabling logic signal is provided to the clock and data stream generator to generate the data stream and clock signal and apply them to the computer.

DESCRIPTION OF THE PREFERRED EMBODIMENT

Figure 1:
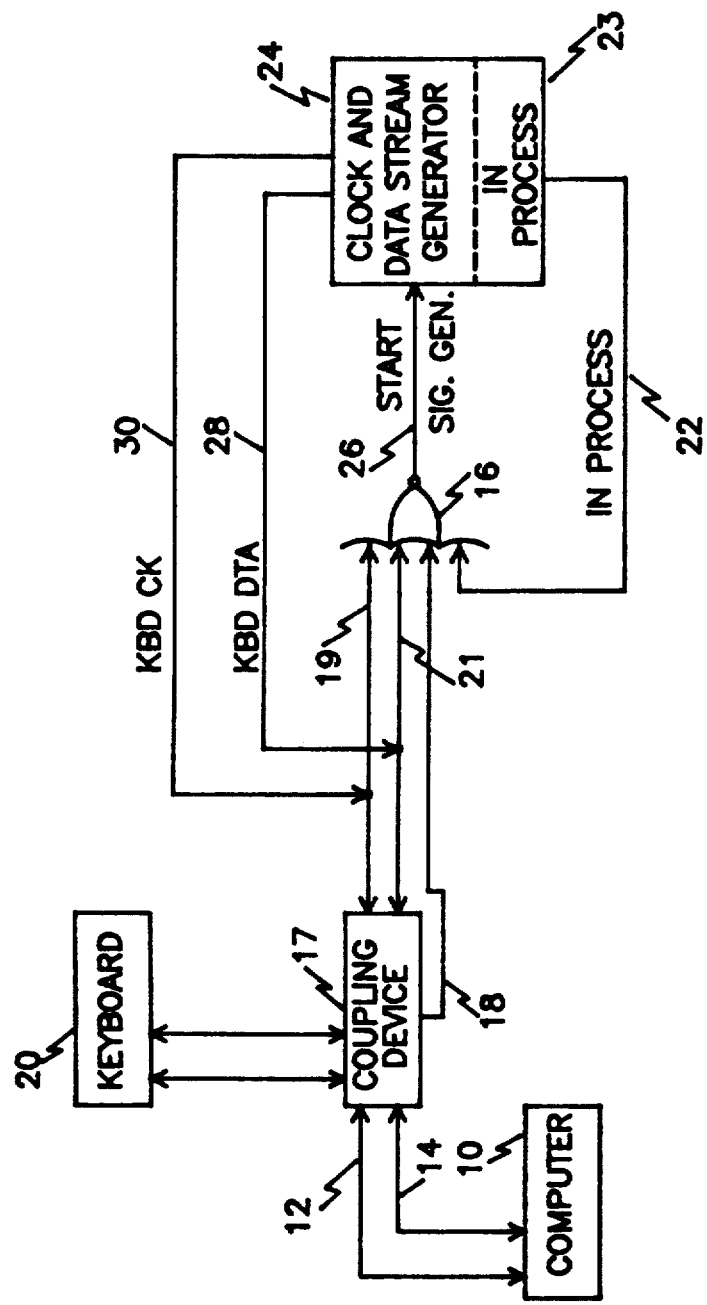
FIG. 1 is a concept diagram of the present invention.

Referring to FIG. 1, the broad concept of the present invention is shown. A computer 10 having keyboard clock and data terminals 12 and 14, respectively, is coupled to inputs of a coupling device 17, such as the COMMANDER module described above, that selectively couples the keyboard and monitor (only keyboard shown) directly to the computer or disconnects the keyboard and monitor and couples the circuit of FIG. 1 to computer 10. Coupling device 17 in turn provides the clock and data signals to inputs of an OR gate 16 via outputs 19 and 21. A third input 18, a "keyboard connected" input, to gate 16 indicates whether a keyboard 20 is connected to computer 10 via coupling device 17, such as the COMMANDER module as described above, and a fourth input 22 is derived from "in process" circuitry 23 of clock and data stream generator 24. Input 22 indicates whether or not a data stream is currently in the process of being generated. The output 26 of gate 16 is fed to clock and data stream generator 24 as an enabling signal in order to initiate generation of clock signals and a data stream. Keyboard clock and data outputs 28 and 30 of clock and data stream generator 24 are coupled in parallel between clock and data inputs 12 and 14 of computer 10 and the respective inputs to gate 16. Thus, in order for an enabling signal to be output from gate 16, which begins operation of clock and data stream generator 24, "keyboard present" line 18 must indicate that a keyboard is not connected, "in process" line 22 must indicate when clock and data stream generator 24 is quiescent, and keyboard clock and data lines 12 and 14 must be "low," indicating a "warm boot" request from computer 21 or a "cold boot" wherein power has just been applied to computer 10. In a "cold boot" situation, clock and data lines 12 and 14 are initially "low," satisfying this condition upon power-up. With these conditions met, clock and data stream generator 24 provides the required series of clock pulses and a data stream indicating to the computer, after it has detected a "keyboard disconnected" condition, that a keyboard is now connected, bypassing the complicated "handshaking" process. Alternately, coupling device 17 and keyboard 20 may be omitted and keyboard clock and data lines 19 and 21 coupled directly to clock and data inputs of computer 10. In this application, to couple a keyboard and monitor to computer 10, the circuitry of FIG. 1 would simply be unplugged from the computer and the keyboard and monitor substituted therefor.

Figure 2:
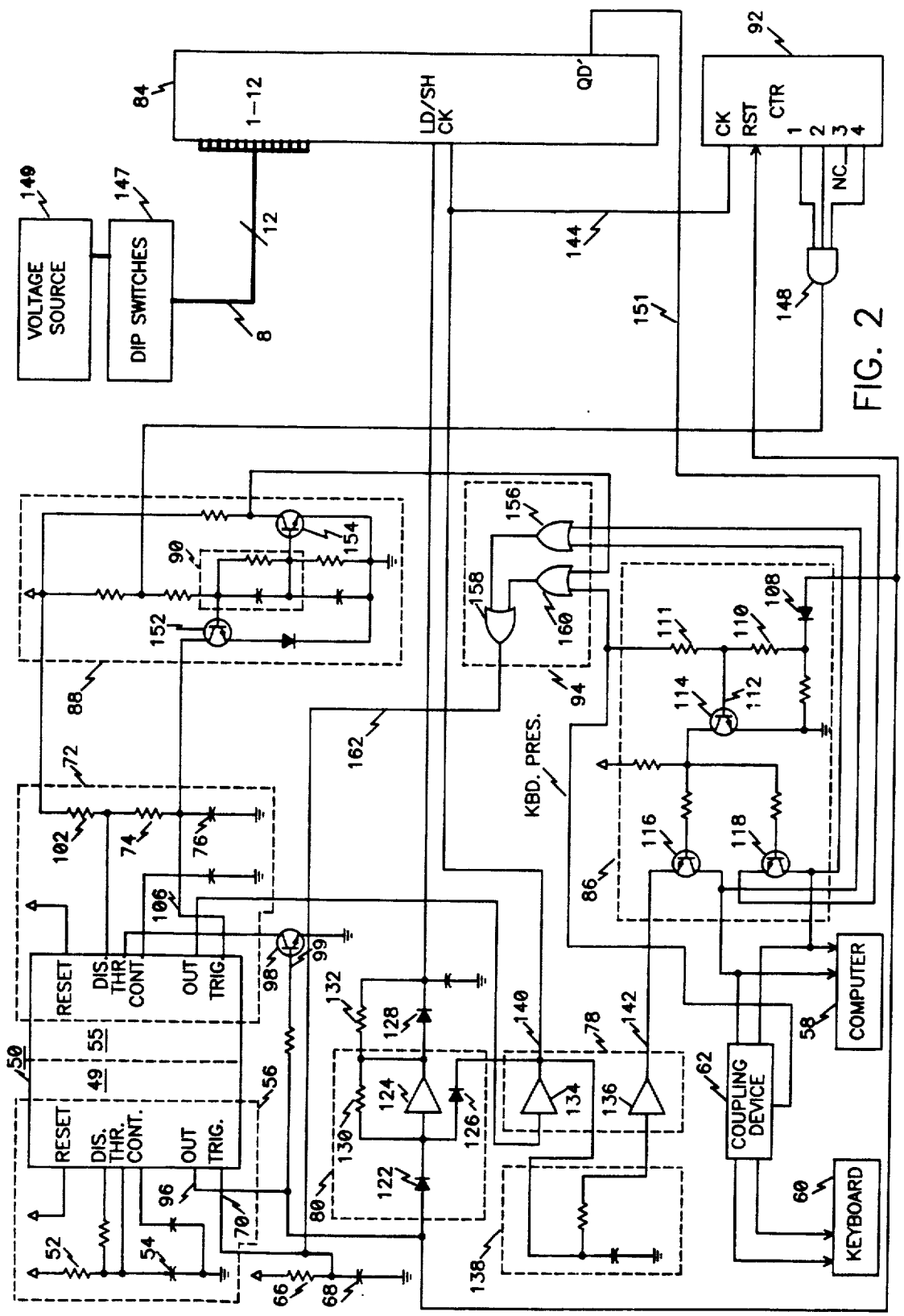
FIG. 2 is a schematic diagram of one embodiment of the present invention wherein groupings of components surrounded by dashed lines are illustrative of a block diagram.

Turning now to FIG. 2, one implementation of the concept diagram of FIG. 1 is shown as circuitry 8, with dashed line blocks indicating groups of components that make up a block diagram. Here, one half 49 of an LM556 timer 50, together with capacitor 54 and resistor 52, serves as an RC time-delay circuit 56 to provide a time delay as long as necessary to allow computer 58 to fail to detect a keyboard 60, which may be coupled to computer 58 via the COMMANDER module. This time delay may be tailored by the appropriate selection of values of capacitor 54 and resistor 52. A second RC circuit 64 consisting of resistor 66 and capacitor 68 is coupled to trigger input 70 of half 49 of timer 50 and provides, upon power-up, what appears to trigger input 70 to be a low-going transition followed by a positive-going transition, as will be explained. The other half 55 of timer 50 serves as an oscillator 72, with the RC time constant of resistor 74 and capacitor 76 setting the frequency of the oscillator. Pulses from oscillator 72 are applied to clock generator circuit 78, which generates clock pulses for circuit 8.

A latch circuit 80 initially provides a short duration "high" logic level and then a negative-going transition to load/shift input 82 of a 12-bit shift register 84, with the "high" serving to enable the loading of data into register 84, and the following "low" functioning to switch the mode of operation of the shift register from "load" to "shift." A coupling circuit 86 selectively couples keyboard clock signals and the selected data character stream to the computer as they are generated. A shutdown circuit 88 stops operation of circuit 8 responsive to the eleventh count of counter 92, which disables oscillator 72, terminating operation of circuit 8.

To initiate a "warm boot", a "warm boot" circuit 94 provides a "low" to trigger input 70 to initiate data stream and clock signal generation. This data stream is requested by computer 58 and is provided if a character stream is not currently being generated and keyboard 60 is not connected to computer 58.

In a "cold" boot situation, when power is first applied to computer 58 and circuit 8, resistor 66 and capacitor 68 provide what appears to be a fast, negative-going transition to trigger input 70 by virtue of the difference in time between power instantly applied to timer 50 and potential applied to trigger 70 by capacitor 68 charging at a slower rate. This transition is applied to trigger input 70 of time delay 56 and begins operation of time delay 56. As stated, this time delay may be set, by the appropriate selection of values of resistor 52 and capacitor 54, to provide essentially any time delay as needed for computer 58 to fail to detect a keyboard. Initially, output 96 of half 49 goes "high" as soon as the negative-going transition to trigger 70 is "low." Output 96 of half 49 remains "high" until capacitor 54 reaches a potential of approximately two-thirds of the supply voltage. This negative-going transition to a "low" is applied to several points in circuit 8 and generally serves to initiate operation thereof. First, this negative-going transition, applied to base 99 of "oscillator enable" transistor 98, shuts "off" transistor 98, which is initially biased "on" by the "high" logic level of output 96. This allows a "high" logic level via resistors 102 and 74 to be applied to trigger input 106 of the other half 55 of timer 50, enabling oscillator 72. Additionally, if a keyboard is not connected, this negative-going transition is applied via diode 108 and resistors 110 and 111 to base 112 of transistor 114 of isolation circuit 86. This transition biases "off" transistor 114, which in turn allows transistors 116 and 118 to be biased "on," coupling circuit 8 to clock and data inputs of computer 58.

If a keyboard is connected to computer 58 by a coupling device 62, coupling device 62 provides an enabling logic signal that is at a "high" logic level, which logic level is applied to base 112 of transistor 114. This saturates transistor 114 and draws bases of transistors 116 and 118 "low," shutting "off" transistors 116 and 118 and isolating circuit 8 from computer 58. Additionally, the negative-going transition at output 96 is applied to latch circuit 80, which consists of an amplifier 124 and diodes 122 and 126. Diodes 122 and 126 serve as blocking diodes, and positive feedback to amplifier 124 via resistor 130 causes the circuit to latch up in the state of the input.

The initial "high" and following negative-going transition from output 96 applied to amplifier 124 causes the output of amplifier 124 to initially go "high", and then be latched "low" by the first negative-going transition of the first oscillator pulse. The output from latch 80 is applied to the load/shift input of a shift register 84 and causes it to initially load data applied to inputs 1-12 during the "high" output of latch 80 and then functions as a shift register after latch 80 is latched "low." Diode 128 and resistor 132 delay the high-to-low transition applied to inputs 1-12 to ensure the clock pulse is received by the shift register prior to the transition.

Pulses from oscillator 72 are applied to a clock generator 78 consisting of buffer amplifiers 134 and 136 and an RC time delay circuit 138. Amplifiers 134 and 136 provide power to the oscillator pulses, and delay circuit 138 introduces a slight phase delay between outputs 140 and 142 of amplifiers 134 and 136, respectively. This time delay allows the discrete bits of data applied to the keyboard input of computer 60 to "settle in" before being read. The delayed clock pulse is applied from amplifier 136 to the emitter of transistor 116, which passes the clock signal to computer 58, emulating a keyboard clock signal. The non-delayed output of amplifier 134 is passed as a clock signal to clock input 144 of shift register 86 and clock input 150 of counter 92.

Shift register 84 has 12 parallel inputs 1-12, which are coupled to a bank of DIP switches 147, in turn coupled to a voltage source 149. The switches are operable to provide each input of register 84 with either a "low" or "high" logic level, allowing the user to configure a data stream to be loaded in parallel into register 84. This data stream is serially output from output 151 of register 84 responsive to clock signals applied to clock input 144. This serial output is applied to the emitter of transistor 118, which in turn passes the data stream, slightly ahead of the clock signal from transistor 116, to the keyboard data input of computer 58, emulating the required keyboard character bit sequence. Alternately, any form of electronic or other conventional storage may be utilized to produce the data stream, such as a ROM (read only memory), a series of flip-flops, bubble memories, etc.

Counter 92, a standard 12-bit binary counter clocked by an input connected to amplifier 134 of clock generator 78, and an AND gate 148 are used to determine at what point to terminate the data stream and associated clock pulses. This is done by connecting inputs of AND gate 148 as shown to the first, second, and fourth bit outputs of counter 92. Connected as such, the output of AND gate 148 goes "high" when the first, second, and fourth outputs are high, corresponding to the eleventh count of counter 92. When this occurs, the logical "high" from AND gate 148 is applied to the bases of transistors 152 and 154, which drive transistor 152 into conduction and draw the voltage level at trigger input 106 of timer 50 to near zero volts. This disables oscillator 72, removing clock pulses from clock generator 78 and ends the sequence of data and clock pulses fed to computer 60. Alternately, the data stream may be terminated by other types of counters, such as decade counters or ring counters, or by a precise time delay that provides a disabling signal at the end of the data stream.

In a "warm boot" situation, computer 60 momentarily draws the keyboard clock and data lines "low," which logic levels are applied to OR gate 156 of "warm boot" circuit 94. Gate 156 then outputs a "low," which is in turn applied to OR gate 158. A second input to OR gate 158 is taken from the output of OR gate 160, which has its inputs connected to "keyboard present" input 120 and the collector of transistor 154 of shutdown circuit 88. Connected as such, when computer 58 pulls the keyboard clock and data lines "low," "keyboard present" 120 is "low," and transistor 154 of shutdown circuit 88 is "on," indicating that circuit 88 is not in the process of generating a data stream. Output 162 of gate 158 then goes momentarily "low" for the duration these conditions are met, with this duration being determined by the length of time computer 58 holds the keyboard clock and data lines "low". This "low" output from gate 158 is applied to trigger input 70 of timer 50, which causes output 96 to go "low", and begins the process as described above.

In operation, and for a "cold boot" situation, the potential applied to trigger input 70 lagging behind power applied to half 49 of timer 50 generates a negative-going transition at trigger input 70, which in turn causes output 96 to be initially "high," followed by a negative-going transition to a "low." These logic levels are applied first to base 99 of oscillator enable transistor 98, which when biased "off" by the negative-going transition, allows oscillator 72 to generate a series of pulses. Additionally, the logic levels of output 96 are applied to LD/SH input 144 of shift register 84, which initially loads selected data from DIP switches 147 into shift register 84 by the "high" logic level, with the "low" logic level providing the "shift" function of shift register 84. Still further, the "low" logic level of output 96 is applied to base 112 of transistor 114, which is biased "off," allowing transistors 116 and 118 to be biased "on" and coupling clock and data signals to computer 58.

The oscillator pulses applied to clock generator 78 are first applied to buffer amplifier 134, which powers clock pulses to the clock input of shift register 84, serially clocking data from the QD' output thereof. Additionally, this clock pulse is applied, through a time delay circuit 138, to a second buffer amplifier 136, which provides a slightly delayed clock pulse via transistor 116 to computer 58, emulating a keyboard clock pulse. The serial data clocked from QD' output of shift register 84 is applied to the emitter of transistor 118, which passes the first 11 data bits to the data input of computer 58. Upon occurrence of the eleventh data bit, the output of AND gate 148 goes "high", with this "high" provided to the base of transistor 152 of shutdown circuit 88 and, after a short delay, to the base of transistor 154.

For a "warm boot", which is requested by computer 58 pulling the clock and data lines "low" and then releasing them, these logic levels are applied to OR gate 156, which then provides a "low" logic level to one input of OR gate 158. OR gate 160, when a keyboard is not present and circuit 8 is not generating a logic signal, provides a "low" to the other input of OR gate 158, causing its output to go "low". This "low" is applied to trigger input 70, causing output 96 to go "high" and initiate the "boot" sequence as described above.

As is apparent from the foregoing, the applicant has provided circuitry for generating a keyboard clock signal and a selected data stream disposed for indicating to a computer that a keyboard is coupled thereto after the computer has detected a "keyboard disconnected" condition, without having a keyboard coupled to the computer.

Having thus described my invention and the manner of its use and construction, it will be understood that various incidental changes and modifications may be resorted to as fairly come within the scope of the following appended claims, wherein I claim:

1. A character and clock signal generator having clock and data outputs couplable to keyboard clock and data inputs of a computer, for generating a stream of data and a keyboard clock signal during an initialization process of said computer wherein the computer has detected a "keyboard disconnected" condition, with circuitry couplable to said keyboard clock and data inputs of said computer for providing a signal indicative of said "keyboard disconnected" condition, said stream of data and said keyboard clock pulse applied to said clock and data inputs of said computer and disposed for indicating to the computer that a keyboard is coupled thereto, said character generator comprising:

a clock and data stream generator having keyboard clock and data output terminals couplable to said keyboard clock and data inputs of said computer, for generating keyboard clock and data signals and applying said signals to said keyboard clock and data inputs of said computer, said clock and data stream generator further comprising:

"in process" circuitry responsive to said clock and data stream generator, and disposed for generating an enabling logic level indicative of a condition that a data stream is currently not being generated and applying said logic level to an "in process" output terminal of said clock and data stream generator, OR logic means having a plurality of inputs and an output applied to said clock and data stream generator, with first and second inputs of said OR logic means coupled to said keyboard clock and data inputs of said computer and to said keyboard clock and data outputs of said clock and data stream generator, and a third input of said OR logic means coupled to said "keyboard disconnected" signal, and a fourth input of said OR logic means coupled to said "in process" circuitry to detect said enabling logic level indicative that the "in process" circuitry is currently not generating a clock and data stream, whereby a data stream and clock signal is initiated and applied to said keyboard clock and data inputs of said computer responsive to said first and second inputs of said OR logic means having a "low" logic level applied thereto, and said third input to said OR logic means is provided with a "low" logic level indicative that a keyboard is not coupled to said computer, and said fourth input to said OR logic means is provided with a "low" logic level indicative that said clock and data stream generator is not currently generating a keyboard clock and data stream, allowing said computer to complete the initialization process.

2. A character and clock signal generator as set forth in claim 1 wherein said clock and data stream generator comprises:

time-delay generation means having an output for providing an enabling signal upon expiration of a selected time delay and an enabling input;

clock signal generation means having a clock signal output and an input coupled to said enabling output of said time-delay generation means and a disable input disposed for terminating operation of said clock signal generation means, for providing a clock signal responsive to expiration of said time delay;

shift register storage means having a plurality of parallel inputs coupled to selectable data levels and a serial output for providing selected said data levels and a clock input coupled to said clock signal output, for providing said data stream responsive to clock pulses applied to said clock input; and binary counting means having a clock input coupled to said clock signal output and a disabling signal output coupled to said disable input of said clock signal generation means, for providing a disabling signal upon occurrence of a selected count, terminating operation of said clock signal generation means.

3. A character and clock signal generator as set forth in claim 1 wherein said "keyboard disconnected" signal is provided by circuitry disposed for selectively coupling a keyboard and monitor to a computer.

4. A character and clock signal generator as set forth in claim 1 wherein said clock and data stream generator comprises:

a time-delay circuit for providing an enabling signal upon expiration of a time delay sufficient for said computer to detect a "keyboard disconnected" condition during said initialization of said computer, and clock pulse generation circuitry including an oscillator circuit, and coupled to said time-delay circuitry, for providing clock pulses to said character and clock signal generator and to said computer responsive to said enabling signal;

a latch circuit coupled to said time-delay circuitry, for providing a momentary first logic level and then a second, latched logic level responsive to said enabling signal;

shift register storage means having a clock input coupled to said clock pulse generation circuitry and a load/shift input coupled to said latch circuit and a plurality of parallel inputs and a serial output, whereupon said first logic level enables loading of data applied to said plurality of parallel inputs and said second, latched logic level enables shift operation of said shift register means as said clock pulses are applied to said clock input of said shift register storage means;

a bank of switches each coupled to a voltage source, with one of each said switches coupled to one of each said plurality of parallel inputs, for providing selected data levels to said parallel inputs;

binary counter means having a clock input coupled to said clock pulse generation circuitry and a reset input coupled to said time-delay circuit and a plurality of outputs, for providing a binary count upon being reset by said first logic level applied to said reset input and said clock pulses applied to said clock input of said counter means;

AND gate logic means having a plurality of inputs coupled to selected ones of said plurality of outputs of said counter means and an output, for providing a disabling signal on said output of said AND gate responsive to said selected ones of said plurality of outputs going to a "high" logic level;

termination circuit means coupled to said output of said AND gate logic means and to said oscillator, for terminating operation of said oscillator responsive to said disabling signal; and selective coupling circuit means coupled to said serial output of said shift register means and to said clock pulse generation circuitry and to said time-delay, for coupling said clock pulses and said data stream to said keyboard clock and data inputs of said computer responsive to said enabling signal from said time-delay.

5. A character and clock signal generator having clock and data outputs couplable to keyboard clock and data inputs of a computer, for generating a stream of data having an ending bit, and a keyboard clock signal, and applying said stream of data and said clock signal to said computer after the computer detects a "keyboard disconnected" condition, said stream of data and said clock signal disposed for indicating to the computer that a keyboard is coupled thereto, and comprising:

time-delay circuit means having an output, for providing on said output an enabling signal upon expiration of a selected time delay;

clock pulse generator means having a clock pulse output and a disabling input, for generating a clock pulse on said clock pulse output responsive to said enabling signal;

shift register storage means having a plurality of inputs coupled to selected logic levels representative of said data stream indicative that a keyboard is coupled to said computer, and a serial output for providing said data stream responsive to said enabling signal;

end bit detection means coupled to said clock pulse output and to said disabling input of said clock pulse generator means, for detecting a clock pulse indicative of generation of the last data bit of the data stream, and providing a disabling signal to said clock pulse generator means after said end bit is generated, and for providing an "in process" signal during a period of time said data stream is being generated; and coupling circuitry coupled to said clock pulse output and to said serial output of said shift register storage means and to said disabling output of said ending bit detection means, for coupling said clock pulse and said data stream to keyboard clock and data inputs of said computer as said clock pulse and said data stream is being generated.

6. A character and clock signal generator as set forth in claim 5 comprising OR gate logic means having at least four inputs and an enabling output, with first and second said inputs coupled to said keyboard clock and data inputs of said computer, and disposed for receiving a "warm boot" signal from said computer, and a third said input coupled to receive said "keyboard disconnected" signal, and a fourth said input coupled to said "in process" signal of said end bit detection means, said OR gate logic means disposed for providing an enabling output to said clock pulse generator responsive to said computer applying a "low" logic signal to said clock and data lines, a "low" applied by said third input indicating a keyboard is not coupled to said computer, and said fourth input having a "low" logic signal indicative that said character and clock signal generator is not in the process of generating a clock and data stream.

7. A character and clock signal generator having clock and data outputs couplable to keyboard clock and data inputs of a computer, for generating a stream of data, and a keyboard clock signal of fixed length, and applying said stream of data and said clock signal to said computer after the computer detects a "keyboard disconnected" condition, said stream of data and said clock signal disposed for indicating to said computer that a keyboard is coupled thereto, and comprising:

time-delay circuit means having an output, for providing on said output an enabling signal upon expiration of a selected time delay;

clock pulse generation means having a clock pulse output and a disabling input, for generating a fixed-length clock pulse stream on said clock pulse output responsive to said enabling signal; and memory storage means initialized to said data stream indicative that a keyboard is coupled to said computer and an output for providing said data stream to keyboard data and clock inputs of said computer responsive to said enabling signal.

8. A character and clock signal generator as set forth in claim 7 comprising detection means for detecting completion of generation of said data stream, and for providing a disabling signal to said clock pulse generation means responsive to said completion.

9. A character and clock signal generator as set forth in claim 8 having a disabling input coupled to switching circuitry disposed for selectively coupling keyboard clock and data inputs to said computer and providing a disabling signal indicative that a keyboard is coupled to said computer, preventing operation of said character and clock signal generator.

10. A character and clock signal generator having clock and data inputs couplable to keyboard clock and data inputs of a computer, for generating a stream of data and a keyboard clock signal during an initialization process of said computer after the computer has detected a "keyboard disconnected" condition, for applying said stream of data and said keyboard clock signal to said computer, indicating to the computer that a keyboard is connected thereto, said character and clock signal generator comprising:

time-delay generation means having an output and an enabling input, for providing an enabling signal on said output responsive to expiration of a selected time delay, and clock signal generation means having a clock signal output and an enabling input coupled to said output of said time-delay generation means and a disabling input disposed for terminating operation of said character and clock signal generator, for generating a clock signal responsive to expiration of said time delay;

memory storage means having a plurality of data inputs each coupled to a selectable logic level, and a serial output for providing a data stream consisting of said selected logic levels;

a clock output coupled to said clock signal generation means, for providing said data stream responsive to clock signals applied to said clock signal output; and counting means responsive to said clock signal and having a disabling output signal coupled to said disabling input of said clock signal generation means, for providing a disabling signal to said clock signal generation means upon occurrence of a selected count, terminating operation of said clock pulse generation means.

11. A character and clock signal generator as set forth in claim 10 wherein said "keyboard disconnected" signal is provided by circuitry disposed for selectively coupling a keyboard and monitor to a computer.

12. A character and clock signal generator as set forth in claim 11 comprising a latch circuit coupled to said input of said time delay generation means, for providing as a latch output a momentary first logic level and then a second, latched logic level responsive to said enabling signal from said time delay generation means.

13. A character and clock signal generator as set forth in claim 12 wherein a load/shift input of said shift register storage means is coupled to said latch output, whereupon said first logic level enables loading of said shift register storage means and said second, latched logic level enables shift operation of said shift register storage means.

14. A character and clock signal generator as set forth in claim 13 wherein discrete said data inputs of said shift register storage means are each coupled to one of a plurality of switches, said switches in turn coupled to a source of potential, for providing to each of said data inputs a selected logic level.

15. A character and clock signal generator as set forth in claim 14 wherein said binary counting means comprises a binary counter having a clock input coupled to said clock signal generation means, a reset input coupled to said latch circuit, and a plurality of outputs, for providing a binary count upon being reset by said first logic level and said clock pulses applied to said clock input, and further comprising AND gate logic means having a plurality of inputs coupled to selected ones of said plurality of outputs of said counter means and an output, for providing a disabling signal on said output of said AND gate logic means responsive to said selected ones of said plurality of outputs going to a "high" logic level, terminating operation of said clock signal generation means.

16. A character and clock signal generator as set forth in claim 15 including selective coupling circuit means coupled to said serial output of said shift register storage means and to said clock signal generation means and to said time-delay generation means, for coupling said clock signal and said data stream to said keyboard clock and data inputs of said computer responsive to said enabling signal from said time delay.

* * * * *